United States Patent [19]
Yhann

[11] Patent Number: 6,031,544
[45] Date of Patent: Feb. 29, 2000

[54] VECTOR MAP PLANARIZATION AND TRAPPING

[75] Inventor: Stephan Yhann, Renton, Wash.

[73] Assignee: Adobe Systems Incorporated, San Jose, Calif.

[21] Appl. No.: 08/810,491

[22] Filed: Feb. 28, 1997

[51] Int. Cl.$^7$ .................................................. G06T 11/00
[52] U.S. Cl. .............................................................. 345/434
[58] Field of Search ..................................... 345/434, 414

[56] References Cited

U.S. PATENT DOCUMENTS

| | | | |
|---|---|---|---|
| 5,295,236 | 3/1994 | Bjorge et al. | 395/134 |
| 5,459,818 | 10/1995 | Grant et al. | 345/414 |
| 5,542,052 | 7/1996 | Deutsch et al. | 395/131 |

*Primary Examiner*—Mark R. Powell
*Assistant Examiner*—Huedung X. Cao
*Attorney, Agent, or Firm*—Fish & Richardson P.C.

[57] ABSTRACT

A vector map representation of page information to perform trapping. The vector map representation combines the positive attributes of both raster and vector based representations to make trapping more efficient by combining the sparseness of the vector representation and the constant unit complexity of the raster representation. In the preferred embodiment of the invention, a page is defined by tiles, and each tile is mapped to a 2-D array of edge pointers referred to as the vector map. Each cell in the vector map contains a list of all of the edges of the image that pass through it. A pair of edges can only interact if they are in the same vector map cell list. Thus, edge intersection and color finding tests are localized as with raster based trapping while the data sparseness of vector based trapping is retained. For a suitably chosen vector map size, a single edge generally does not intersect many cells. A trapping function is applied to edges as determined from the vector map.

12 Claims, 3 Drawing Sheets

VECTOR MAP PLANARIZATION AND TRAPPING

BACKGROUND OF THE INVENTION

1. Field of the Invention

This invention relates to planarizing a set of overlapping objects, and more particularly to color trapping in electronic printing systems.

2. Description of Related Art

For many years, the preferred process for color printing on paper has been to process the page in multiple exposures, or separations. Each separation exposes selected areas of the paper to an ink of a different color. The usual process ink colors are cyan, magenta, yellow and "key" (CMYK), where key is usually black. Additional color inks are often used as spot colors in additional separations.

High-quality printing, such as that required by the publishing industry, poses many difficult problems in controlling the separations. For example, color printing is compromised if paper is not properly aligned as the paper makes multiple passes through the plates of a printer. As a result, the several inks are never perfectly aligned with one another, and a small gap between regions of different colors may occur, which is often quite visible to the eye as an off-color line. This problem is typically referred to as misregistration.

One common solution to the registration problem is to perform a technique known as "trapping". As color separations are generated, regions of lighter color may be expanded or "spread" beyond their nominal boundaries, while regions of darker color may be contracted or "choked" within such boundaries to create an overlap of colors on the second and subsequent ink passes. The overlap mitigates the effects of misregistration. Trapping techniques have traditionally been performed manually. Although tedious, in the past, manual trapping techniques have been used in applications such as magazine publishing, where the time and labor required to create individual traps for each printed page are economically justified, or in packaging, where the quality of print is important.

In recent years, a new class of low-cost applications in the publishing industry have emerged, namely "desktop" publishing. A desktop publishing system user typically uses a standard personal computer to specify an output page as a computer file in a page description language (PDL) such as "Postscript". (Postscript is a trademark of Adobe Systems, Incorporated of Mountain View, Calif.) The PDL file is then typically sent to a PDL-compatible automatic page setter, which interprets the file and renders the several color separations onto film for later photolithographic manufacture of offset printing plates.

In recent years, computer systems that perform trapping electronically have come into widespread use. One approach to electronic trapping is to have the originating program also create traps for the graphics. As an example, in drawing programs such as Aldus Freehand®, a user is allowed to add outlines around objects to accommodate trapping. Trapping approaches at the originating program level are beneficial because additional trapping costs may be eliminated, i.e., it is not necessary to utilize a post-processing program or traditional trapping techniques. However, trapping capabilities in originating programs have typically been very limited. One shortcoming is apparent in situations where the background and/or foreground is formed by a number of differently colored objects. This situation arises, for example, where individual text characters overlap more than one object. Typical originating programs with trapping capabilities tend to handle objects such as text or boxes in a relatively course fashion, such that traps are only able to be applied to an entire text block, or at best an entire character. Thus, the trap results in these instances are less than desirable. Furthermore, because trap parameters (e.g., overlap width) are specific to the characteristics of each printing press, these values are typically not available at the time a document is created, and requiring content creators to have intimate knowledge of press characteristics places an additional burden on users of these programs.

An automated approach, known as "raster trapping", has been to: (1) start with a PDL file defining a page; (2) convert the vector graphics and/or text within the PDL file into a raster (bit mapped) image at a desired output resolution by means of a raster image processor (RIP); and (3) trap the raster image using pixel data comprising the image. The third step usually requires a creation of a separate plane in a frame buffer for each separation. The planes of the frame buffer are then trapped on a pixel-by-pixel basis, and the result used to control printing of each plane's respective color. As will be appreciated, this approach is very memory intensive, and is input/output bound (a problem even with computers having unlimited memory).

Advantages of raster trapping are: (1) the RIP interpreter has already figured out the interaction and color of edges in the frame buffer; and (2) the operations used to find the color transitions are very simple and the complexity of the operation to process a single frame buffer pixel is constant (i.e., it is a localized operation). Disadvantages of raster based trapping are: (1) the entire frame buffer must be rendered and examined for color changes; and (2) the frame buffer size increases with the square of the page size and resolution and linearly with the number of inks. These factors impose a high data throughput requirement.

A more recent automated approach is set forth in U.S. Pat. No. 5,295,236, titled "Applying Traps to a Printed Page Specified in a Page Description Language Format" and assigned to the assignee of the present invention. The '236 patent discloses a method and apparatus for electronically trapping a printed color page in a desktop publishing, layout, graphics, or similar applications program. The method translates PDL instructions comprising a printed page into a vector-based format suitable for detection and analysis of edges between color regions in the printed page; creates, according to a set of trapping rules, a set of traps at the color edges; and produces a trap output file that includes the traps expressed in PDL format. When the PDL file is interpreted for printing, the traps are processed in the same manner as the original data.

Advantages of vector based trapping are: (1) virtually any printed page that is expressed in a PDL format may be trapped regardless of the application that originally creates the graphics, i.e., the originating program; (2) generally, the number of edges is relatively small compared to the number of pixels in the frame buffer; and (3) the number of edges is approximately linear with respect to resolution and data are relatively independent of the number of separation inks. Disadvantages of vector based trapping are: (1) the interaction of edges and objects must be determined by the trap engine; and (2) the operations used to process the vectors are relatively complex compared to raster operations, and the complexity involved in processing a single edge increases with the number of edges.

From the above it is clear that the advantages and disadvantages of the two automated approaches are almost mutually exclusive. Indeed, going from simple artwork with sparse edge distributions to complex artwork in which the edge density is high, the performance advantage swings from vector based trapping to raster based trapping.

What is needed is a method and system of automatically trapping pages that is relatively simple in implementation, can process any page, and does not require large memory or processor resources compared to prior methods. The present invention provides such a method and system. The most general implementation of the invention also provides a method for planarizing a set of objects (i.e., reduce a set of overlapping objects to a non-overlapping set of objects).

SUMMARY OF THE INVENTION

The invention uses a vector map representation of page information to perform trapping in particular, and in the more general case to planarize a set of objects (i.e., reduce a set of overlapping objects to a non-overlapping set of objects). The vector map representation combines the positive attributes of both raster and vector based representations to make trapping more efficient by combining the sparseness of the vector representation and the constant unit complexity of the raster representation.

In the preferred embodiment of the invention, a page is defined by tiles, and each tile is mapped to a 2-D array of edge pointers referred to as the vector map (to draw an analogy to a bitmap). Each cell in the vector map contains a list of all of the edges of the image that pass through it. A pair of edges can only interact if they are in the same vector map cell list. Thus, edge intersection and color finding tests are localized as with raster based trapping while the data sparseness of vector based trapping is retained. For a suitably chosen vector map size, a single edge generally does not intersect many cells. Alternatively, a quad-tree representation can be used that adaptively subdivides cells. Applying edge intersection and color finding tests effectively planarizes the objects on the page. When color trapping, a trapping function is applied to edges as determined from the vector map.

Some advantages of the vector map representation aspect of the invention are:

(1) Reduction in the complexity involved in determining edge intersections in complex PDL pages and PDL pages with many small edge segments (e.g., PDL pages with many fonts, vignettes, patterns, etc.).

(2) Capture and retention of the relative spatial relationships between edges; this information is propagated through the various steps involved in trapping (from determining object intersection, hidden vector removal through trap color selection, trap placement and trap shaping). The vector map representation is a simple and effective way to capture and store the spatial relationships between edges in a sparse format. The alternative in a pure vector based approach usually is to determine the spatial relationships between edges.

(3) Reduction in the complexity of the trapping algorithm because other basic data strictures are propagated through the entire trapping process with little change and data sparseness is maintained. Typically pure vector based approaches require that the date (edge points) be maintained in sorted lists.

(4) Easy adaptation to the input data: a small number of edges per tile generates a coarser grid, and a large number of edges per tile generates a finer grid.

(5) Ability to extend to a hierarchical vector map representation where cells in a grid are subdivided in a quad-tree data structure in which the leaf nodes of the quad-tree point to the edge lists. In such a representation, cells are partitioned such that areas with high edge densities are more finely sub-divided than those with fewer edges.

(6) Modifiable to be used with a rasterized bit-map: if the vector map is superimposed on the raster map, the raster map can be used to resolve edge interactions. In such a scheme, edges are deleted from the vector map when there is no corresponding edge in the raster map and the edge colors are determined from the raster map. Edges can be trapped in the vector map and the traps painted directly in the map before output of the rasterized page.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Overview

In the preferred embodiment of the invention, a page is defined by tiles, and each tile is mapped to a 2-D array of edge pointers referred to as the vector map (to draw an analogy to a bitmap). Each cell in the vector map contains a list of all of the edges of the image that pass through it. A pair of edges can only interact if they are in the same vector map cell list. Thus, such planarizing functions as edge intersection, edge color finding, hidden edge removal, trap shaping, and edge filtering tests are localized during all steps as with raster based trapping, while the data sparseness of vector based trapping is retained. For a suitably chosen vector map size, a single edge generally does not intersect many cells. When color trapping, a trapping function is applied to visible edges as determined from the vector map and trap polygons are generated on the vector map.

More particularly, to apply a vector map representation concept in planarizing a page, the page is divided into equal area square tiles (e.g., ~0.5 inches or less). Each tile is planarized independently by constructing a vector map for the tile in which all polygons intersecting the tile are entered. Polygon contours can be drawn in the vector map with, for example, a quick line drawing algorithm (e.g., Bresenham's Algorithm) or a lookup table (practical if the number of cells in the vector map is not large). Polygon-tile intersection can be determined with a simple bounding box test.

In the preferred trapping embodiment, the initial cell size of the vector map for a tile is made proportional to the estimated average polygon edge and is constrained to be greater than the maximum trap-polygon width (an input parameter to the trapping application). The average polygon edge length $\overline{E}$ can be estimated as:

$$\overline{E} = \frac{\text{polygon bounding box perimeter length}}{\text{number of bounded polygon points}}$$

EXAMPLE

Figure 1:
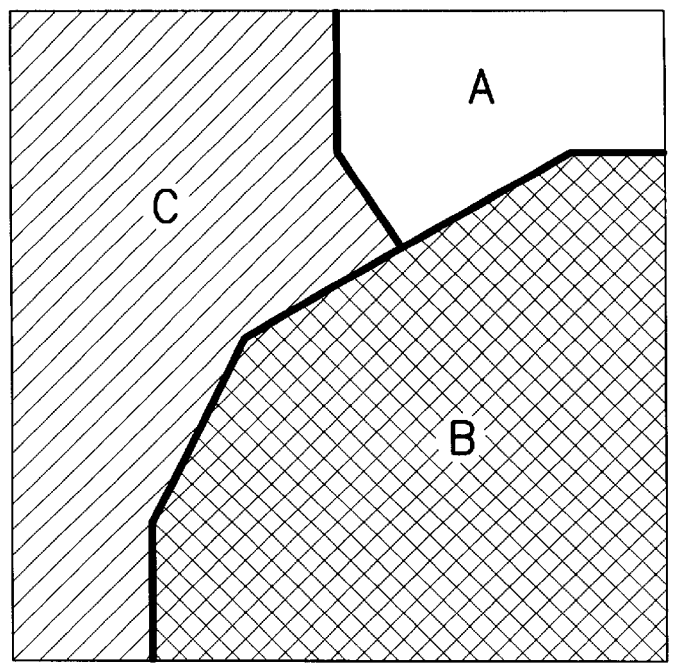
FIG. 1 is a diagram of a tile with part of two polygon objects on a colored background.

An example of vector map trapping for part of a page comprising two objects on a background object is shown in FIGS. 1–5. More specifically, FIG. 1 is a diagram of part of two polygon objects A, B on a tile with background object C (a background object can either be the page or an object that entirely covers the tile). FIG. 1 shows how the objects would print, with object B overprinted on object A, and both objects A, B printing on top of object C.

Figure 2:
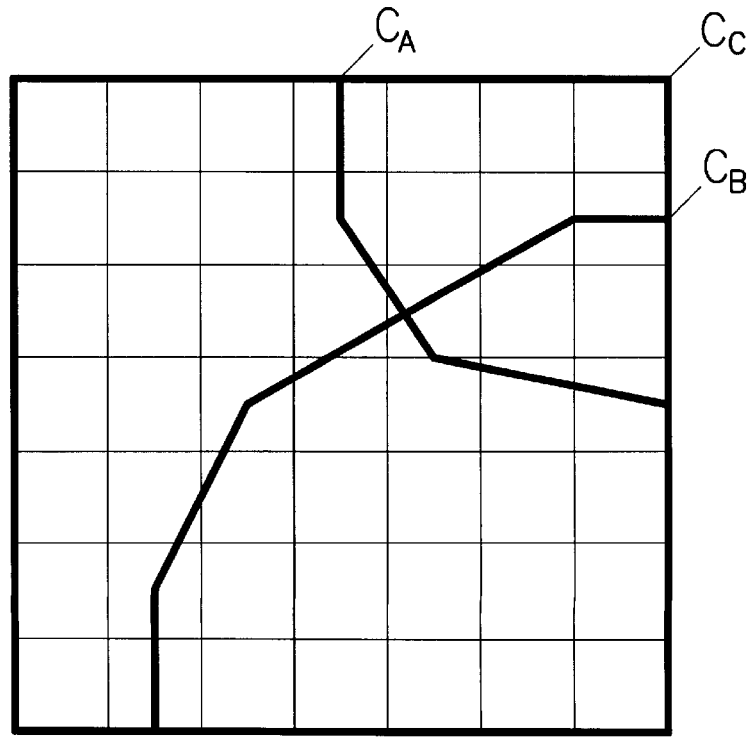
FIG. 2 is a diagram of polygon contour segments, comprising part of the two objects shown in FIG. 1, drawn on a vector map grid superimposed on a tile of an image.

FIG. 2 is a diagram of polygon contour segments $C_A$, $C_B$, comprising edges of the two objects A, B, drawn on an arbitrary 7×7 vector map grid superimposed on the tile of FIG. 1. The background object C is represented by the vector map boundary $C_C$.

Figure 3:
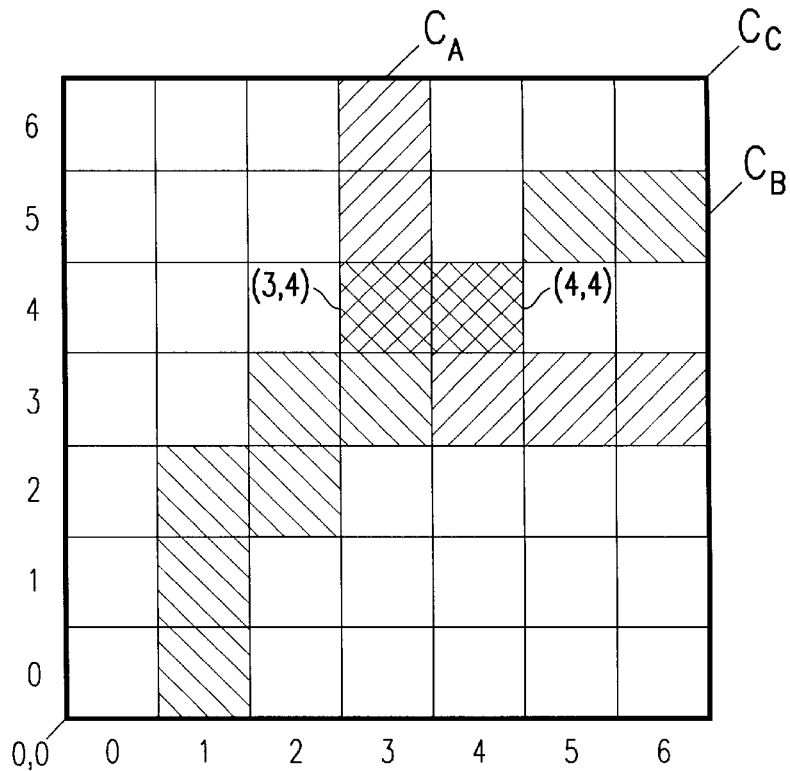
FIG. 3 is a diagram of a vector map representation of the tile of FIG. 2.

FIG. 3 is a diagram of a vector map representation of the tile of FIG. 2. The polygon contour segments $C_A$, $C_B$ are shown visually represented in the vector map as hatched cells. In the preferred embodiment, a pointer to each edge segment from each contour segment $C_A$, $C_B$ that touches a cell is entered in an edge list that is maintained for that cell. (Note that while a graphical representation of a vector map is depicted, any desired data structure can be used to capture the same information. For example, a lookup-table data structure could be used that simply keeps track of cell numbers for cells having at least one edge segment, and the number of edge segments in that cell. Other data structures, such as arrays, linked lists, etc., can also be used.) Also, any cell may be subdivided if its edge count is too high, in which case a quad-tree with leaf nodes pointing to the edges may be used. However, this is not required.

In the example shown, the two cross-hatched cells (3,4) and (4,4) in FIG. 3 are the only cells with more than two edges entered in the cells' edge list, and in which an intersection test is needed. Edges in the remaining cells are readily seen to have no intersections because they do not share their cells, as determined from the number of edges in the edge list of each cell (i.e., if the number of edges is less than 2, a cell cannot have intersecting polygon lines). As can be readily understood from FIG. 3, by representing tiles as vector maps, determination of intersecting contour segments is accomplished without complex data processing or large memory requirements.

Intersections of contour segments defining the contours of objects indicate that one object is "on top" of another object, and require processing to determine which edge segments would be hidden, and thus not printed. Trapping is applied only to non-hidden edges. To deal with intersections, a list is maintained of all start and end points for the polygon contour segments. New contour segments are generated when intersecting edges split. In the preferred embodiment, as polygon edges are drawn in the vector map cells, intersections with any edges already in the cells are determined from examination of each cell's edge list. Two intersecting edges are split to produce four new edges and the resulting contour segments are tracked by inserting two new contour start and end points into the start and end point list.

Figure 4:
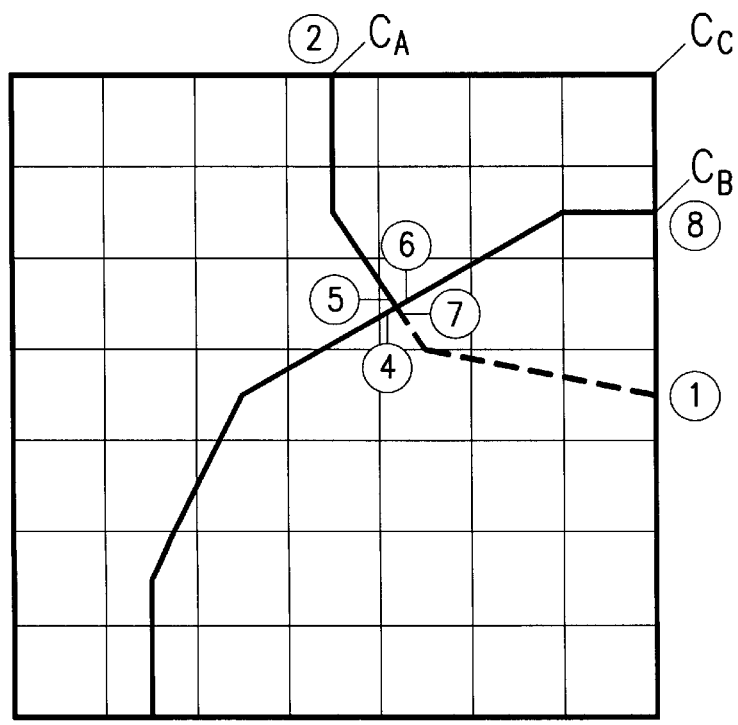
FIG. 4 is a diagram of a vector map representation of a tile of a page, showing hidden line determination and removal.

For example, FIG. 4 is a diagram of a vector map representation of a tile of a page showing hidden line determination and removal. Assume that contour segment $C_A$ is drawn first. It has start-end points of <1,2>. Contour segment $C_B$ is then drawn, with start point <3>. However, when the drawing of contour segment $C_B$ reaches an intersection with contour segment $C_A$, contour segment $C_B$ is split into segments <3,4> and <6,8>, while contour segment $C_A$ is split into segments <1,7> and <5,2>. The new start points <5>, <6> and the new end points <4>, <7> are entered into the start-end point list.

In the example shown, contour segments created by edge splitting and segments connected to them that are to the "left" of the drawn contour segments are deemed to be hidden if the current contour segment's object is not overprinting (this assumes that the polygon's interior is to the left of the current edge). If a polygon covers a portion of the vector map in FIG. 2, then previously entered contour segments in that vector map are marked as hidden and the vector map can be cleared. For example, the dashed contour segment <1,7> in FIG. 4 is hidden under the second polygon object B (see FIG. 1). It is not visible and is flagged as such, and the start and end points deleted from the start-end list.

Figure 5:
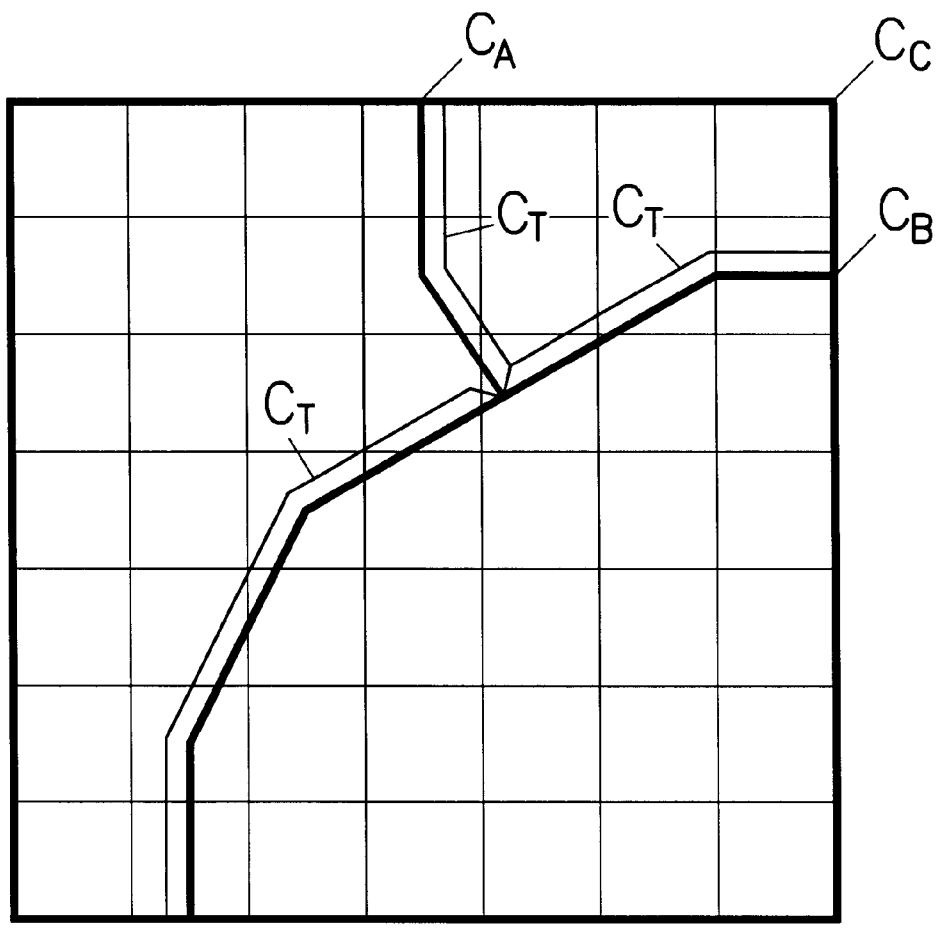
FIG. 5 is a diagram of a vector map representation of a tile of a page, showing applied traps.

The vector map in FIG. 4 is then trapped by tracing each visible contour segment and generating a trap along it. A contour segment is traced from its start in the contour segment start-end list up to its end (this is an alternative to scanning the vector map for cells with edges). In the preferred embodiment, the trap function comprises a sequence of trap polygons $C_T$ represented such that the trap polygons $C_T$ share a common edge with the object contours, in known fashion, and a color comprised of inks on the left and right sides of the object contours. Outside color is determined by scanning along a row or column of the tile map until a cell with edges is encountered. The color of the closest edge is used. FIG. 5 is a diagram of a vector map representation of a tile of a page, showing applied trap polygons $C_T$. Other trapping functions may be used if desired.

In the preferred embodiment, the trap polygons also are drawn in the vector map and the cells containing the polygon and adjacent cells (if necessary) are checked for edges, in the manner set forth above for the original objects, to determine if the trap polygon will intersect edges or trap polygons from other contour segments. The cell size is assumed to be greater than the maximum trap-width (the width of the trap polygons). Intersecting polygons are reshaped to eliminate the intersection, in known fashion.

Note that trap polygon generation and edge drawing in the vector map can be combined in a single step, so that the trap polygons are generated with the edges and entered into the vector map. In this case, trap polygons for hidden edges are discarded and trap polygons are reshaped where trap polygon-edge intersections are detected.

While a vector map representation requires additional memory for the vector map and some overhead associated with creating the vector map, the resolution of the vector map can be dynamically selected on a per-tile basis to minimize the effects of both of these issues. For example, a very low resolution (few cells) can be used for a vector map if a tile has few objects, and higher resolution can be used for a vector map if a tile has many objects or characters.

Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A computer method of representing page information comprising at least one object, to perform separation of overlapped objects, comprising the steps of:
   (a) segmenting a page into at least one image information tile;
   (b) representing each tile as a grid array comprising at least one cell;
   (c) determining, for each grid array, contour segments for each object appearing on the grid array; and
   (d) indicating at least potential intersections of multiple contour segments within cells of each grid array.

2. The computer method of claim 1, further comprising the steps of:
   (a) determining which cells contain indications of intersecting contour segments; and
   (b) determining, from such indications, which of the intersecting contour segments would be hidden by at least one other object.

3. The method of claim 2, further comprising the step of:
   (a) performing a trap function on all contour segments that are not hidden.

4. The method of claim 2, further comprising the step of:
   (a) determining from such indications a color for both sides of each contour segment.

5. A computer system for representing page information comprising at least one object, to perform separation of overlapped objects, comprising:
   (a) means for segmenting a page into at least one image information tile;
   (b) means for representing each tile as a grid array comprising at least one cell;
   (c) means for determining, for each grid array, contour segments for each object appearing on the grid array; and
   (d) means for indicating at least potential intersections of multiple contour segments within cells of each grid array.

6. The computer system of claim 5, further comprising:
   (a) means for determining which cells contain indications of intersecting contour segments; and
   (b) means for determining, from such indications, which of the intersecting contour segments would be hidden by at least one other object.

7. The computer system of claim 6, further comprising:
   (a) means for performing a trap function on all contour segments that are not hidden.

8. The computer system of claim 6, further comprising the step of:
   (a) means for determining from such indications a color for both sides of each contour segment.

9. A computer program, residing on a computer-readable medium, for representing page information comprising at least one object, to perform separation of overlapped objects, the computer program comprising instructions for causing a computer to:
   (a) segment a page into at least one image information tile;
   (b) represent each tile as a grid array comprising at least one cell;
   (c) determine, for each grid array, contour segments for each object appearing on the grid array; and
   (d) indicate intersections of multiple contour segments within cells of each grid array.

10. The computer program of claim 9, wherein the computer program further includes instructions for causing a computer to:
    (a) determine which cells contain indications of intersecting contour segments; and
    (b) determine, from such indications, which of the intersecting contour segments would be hidden by at least one other object.

11. The computer program of claim 10, wherein the computer program further includes instructions for causing a computer to:
    (a) perform a trap function on all contour segments that are not hidden.

12. The computer program of claim 10, wherein the computer program further includes instructions for causing a computer to:
    (a) determine from such indications a color for both sides of each contour segment.

* * * * *

UNITED STATES PATENT AND TRADEMARK OFFICE
CERTIFICATE OF CORRECTION

PATENT NO. : 6,031,544
DATED : February 29, 2000
INVENTOR(S) : Stephan R. Yhann

It is certified that error appears in the above-identified patent and that said Letters Patent is hereby corrected as shown below:

Title page,
Item [56], References Cited, OTHER DOCUMENTS,
please insert the following documents:

-- Blatner, David *et al.*, Real World Photoshop 3 Industrial Strength Production Techniques, pp. 453-455 (1996)

Fits Imaging *et al.*, Live Picture, pp. 108-111 (1994)

Wolberg, George, Digital Image Warping, pp. 52-56, 214-219 (1990)

Meyers, Scott, More Effective C++, pp. 190-194 (1996) --

Signed and Sealed this

Nineteenth Day of February, 2002

*Attest:*

JAMES E. ROGAN
*Attesting Officer*     *Director of the United States Patent and Trademark Office*